(12) United States Patent
Soroushian et al.

(10) Patent No.: US 7,929,842 B2
(45) Date of Patent: Apr. 19, 2011

(54) REALTIME RECORDING OF AUDIO VIDEO INTERLEAVED STREAMS

(75) Inventors: Kourosh Soroushian, San Jose, CA (US); Giuseppe Andreello, San Francisco, CA (US); Paul R. Swan, Milpitas, CA (US)

(73) Assignee: LSI Corporation, Milpitas, CA (US)

( * ) Notice: Subject to any disclaimer, the term of this patent is extended or adjusted under 35 U.S.C. 154(b) by 1289 days.

(21) Appl. No.: 11/500,830

(22) Filed: Aug. 8, 2006

(65) Prior Publication Data
US 2008/0037958 A1 Feb. 14, 2008

(51) Int. Cl.
*H04N 5/928* (2006.01)
(52) U.S. Cl. .................. 386/338; 386/344
(58) Field of Classification Search ............... 386/95, 386/96, 98, 125, 126
See application file for complete search history.

(56) References Cited

U.S. PATENT DOCUMENTS
2007/0162568 A1* 7/2007 Gupta et al. .............. 709/219
* cited by examiner

*Primary Examiner* — Huy T Nguyen
(74) *Attorney, Agent, or Firm* — Christopher P. Maiorana, PC (57) ABSTRACT

A method of recording Audio-Video Interleaved (AVI) files on a disc, comprising the steps of (a) allocating a predetermined amount of space on the disc as a reserved track, (b) encapsulating audio data and video data into corresponding audio chunks and video chunks to be recorded on the disc, (c) adding a first amount of padding to (i) create a first gap and (ii) position the first gap in relation to the audio chunks and the video chunks in response to completely recording all of the audio chunks and the video chunks, (d) recording data on the reserved track and (e) adding a second amount of padding to (i) create a second gap and (ii) position the second gap in relation to the audio chunks and the video chunks to allow the recording of the Audio-Video Interleaved file to be compliant with a predefined disc standard.

19 Claims, 8 Drawing Sheets

REALTIME RECORDING OF AUDIO VIDEO INTERLEAVED STREAMS

FIELD OF THE INVENTION

The present invention relates to digital recording generally and, more particularly, to a method and/or apparatus for implementing realtime recording of audio video interleaved streams.

BACKGROUND OF THE INVENTION

The transformation of analog waves to a digital representation has revolutionized data storage. In multi-media presentations, digitization of sound and moving pictures has transformed how audio and video media is captured, created, transported, heard, and viewed. Various standards have been implemented in the areas of compression, physical storage, multiplexing, and transmission of digitized audio and video signals. Standardization of file formats and file systems has also been introduced, in addition to a multitude of storage media for the transport and storage of the new formats.

The introduction of multimedia formats into the Personal Computer (PC) domain has lead to an infusion of technology between the PC and the consumer marketplace. This technological exchange has resulted in an almost mandatory support of many product features common to both market segments. The support is not only limited to wide product categories, but a hybrid of specific features which when put together present an attractive package for the creation, transport, and containment of digital audio and video streams.

It would be desirable to implement a system for the real-time recording of digital audio, video and data streams encapsulated in the Audio-Video-Interleaved (AVI) logical file format that may be easily stored onto any variety of write-once or re-writable media, such as a CD or DVD.

SUMMARY OF THE INVENTION

The present invention concerns a method of recording Audio-Video Interleaved (AVI) files on a disc, comprising the steps of (a) allocating a predetermined amount of space on the disc as a reserved track, (b) encapsulating audio data and video data into corresponding audio chunks and video chunks to be recorded on the disc, (c) adding a first amount of padding to (i) create a first gap and (ii) position the first gap in relation to the audio chunks and the video chunks in response to completely recording all of the audio chunks and the video chunks, (d) recording data on the reserved track and (e) adding a second amount of padding to (i) create a second gap and (ii) position the second gap in relation to the audio chunks and the video chunks to allow the recording of the Audio-Video Interleaved file to be compliant with a predefined disc standard.

The objects, features and advantages of the present invention include providing realtime recording of AVI streams on write once media that may (i) be compliant with restrictions of a write once media (WOM) standards (ii) provide a common method for realtime recording of AVI files on a number of writable media formats and/or (iii) be easy to implement.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The AVI file format is a popular format for the encapsulation of audio, video, and data content. With the origins of the AVI format dating back to 1984, AVI enjoys widespread support by almost all software vendors on the personal computer (PC), as well as vendors running on other platforms and operating systems. AVI is a special case of the Resource Interchange File Format (RIFF) file. The RIFF file may use four-character codes to identify each of a number of file elements (or chunks). A chunk may be the primary building block of the AVI file format.

Figure 1:
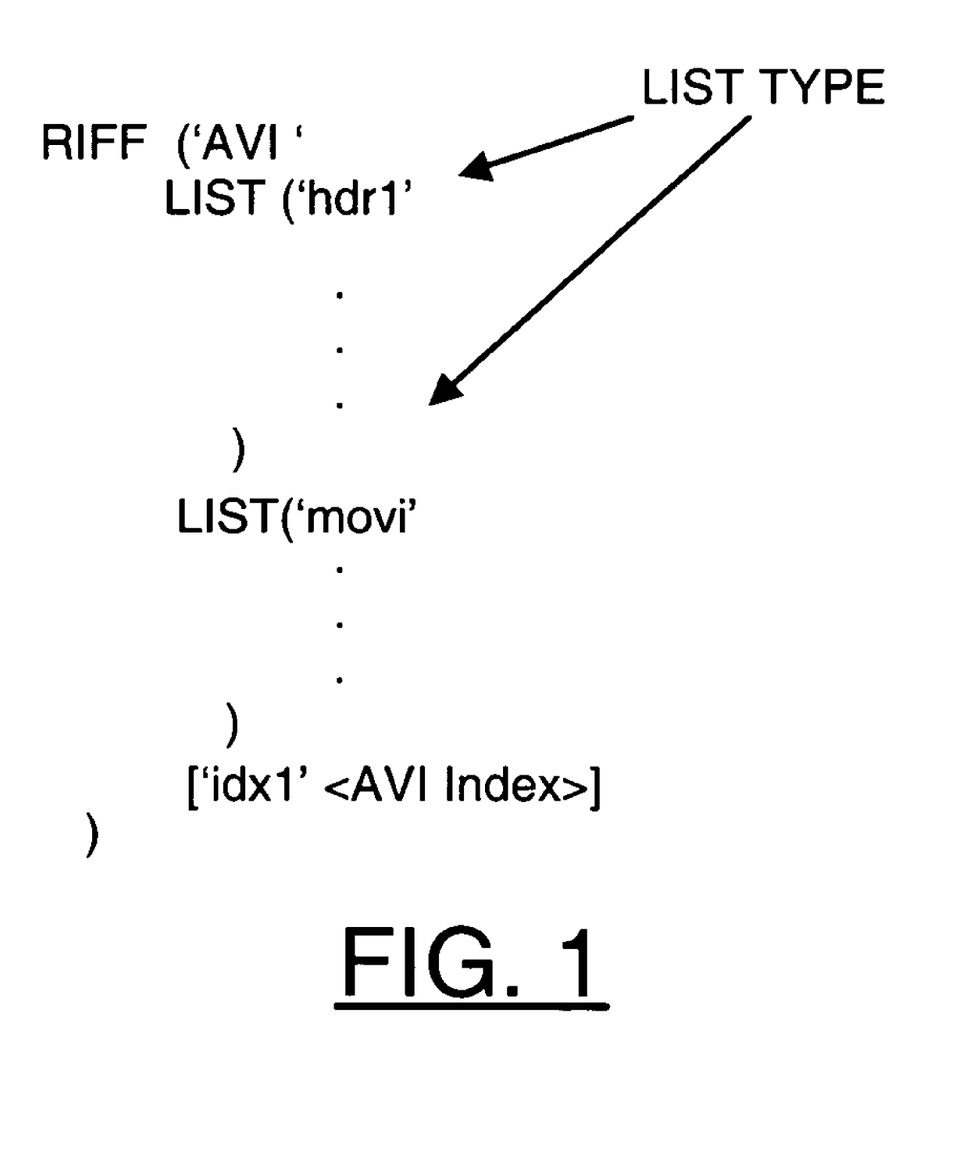
FIG. 1 is a diagram illustrating components of an AVI file.

FIG. 1 illustrates some of the main components of an AVI file. An AVI file may include an RIFF form header, a list chunk, a sub-chunk, a data sub-chunk, an index chunk, and/or other pre-defined or proprietary lists and chunks. The RIFF Form Header may be the primary file identifier. The list chunk and the sub-chunk may define (i) the format of the overall stream (or header sub-chunk) and (ii) the individual components (or data sub-chunks). The data sub-chunks may carry a single video frame followed by corresponding audio frames in a different chunk. The index chunk may be used for random access into the file.

The AVI file may encapsulate both compressed or uncompressed video data and audio data. The AVI file may include any other data type. In one example, the AVI file may include subtitles, text, meta-data, padding, and private data. With such flexibility, the AVI file has become immensely popular and survived several decades.

The AVI file may use chunks as the basic building block. The first chunk in the AVI file may be specified to be the RIFF chunk. The RIFF chunk may have a form type specified by the four-character code "AVI". The four character code "AVI" may indicate that the file is an AVI RIFF file. All AVI files generally include two mandatory list chunks. Such mandatory list chunks may define the format of one or more encapsulated streams. AVI files may also include an index chunk. The index chunk may specify the location of data chunks within the file.

The list chunk and the index chunk may be sub-chunks of the RIFF 'AVI' chunk. A list 'hdrl' chunk may (i) define the format of the data and (ii) be specified as the first needed list chunk. A list 'movi' chunk may include data for the AVI sequence. The list movi chunk may be specified as the second needed list chunk. An 'idx1' chunk may be used to represent the index of each video, audio and any other data chunk in the file. The order of the list hdrl chunk, the list movi chunk, and the idx1 chunk may be maintained in the order as shown in FIG. 1. The particular order of the list hdrl chunk, the list movi chunk and the idx1 chunk may be varied to meet the design criteria of a particular implementation. The AVI file may include additional lists (not shown) to describe other aspects of encapsulated streams.

Figure 2:
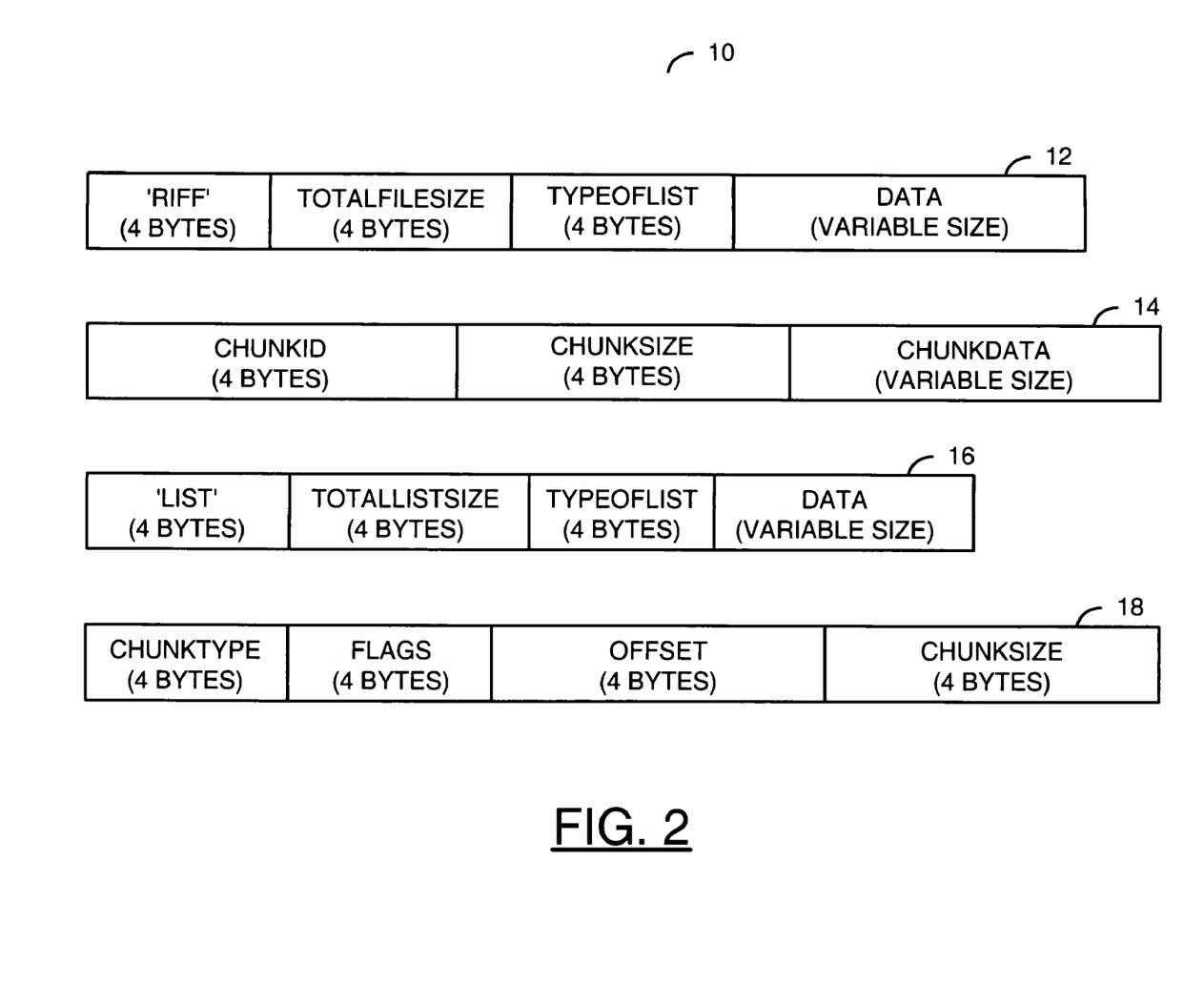
FIG. 2 is a diagram illustrating formats for various AVI chunks.

FIG. 2 illustrates formats for an AVI chunk 10. The AVI chunk 10 generally comprises a RIFF chunk 12, an encapsulated chunk 14, a LIST chunk 16 and an index chunk 18. The RIFF chunk 12 includes an 'RIFF' header, a total FILE size, a type of file and DATA. The encapsulated chunk 14 includes a ChunkID, a Chunk Size, and ChunkData. The ChunkID may be a four-character code used to identify the data encapsulated within the chunk. The ChunkSize may be defined to represent the total size of the chunk. The ChunkData may be defined to include actual bytes encapsulated by the chunk. Padding and alignment standards may be imposed on the length of the chunk. The types of padding and alignment standards imposed on the length of the chunk may be varied to meet the design criteria of a particular implementation. The list chunk 16 includes a 'LIST', a totalListSize, a typeOfList, and Data. The 'LIST' may be defined to represent the actual four-character code.

The index chunk 18 includes a ChunkType, Flags, an Offset and a ChunkSize. The index chunk 18 may be defined as the last chunk in the AVI file. The index Chunk 18 may be designated by FOURCC codes (e.g., 'idx1' or 'indx'). The particular designation of the index chunk 18 may be varied to meet the design criteria of a particular implementation. The presence of the index chunk 18 in the AVI file may be optional. The index chunk 18 may be used for the purpose of navigating through the AVI file. The index chunk 18 may include information about every data chunk (e.g., video, audio, and other types) in the AVI file. Such information may be related to each of the chunks and may be stored in a total of 16 bytes. For example, 4 bytes may be stored in the Chunk Types, 4 bytes may be stored in the Flags, 4 bytes may be stored in the Offset and 4 bytes may be stored in the Chunk Size.

The ChunkType may be a designation of the actual chunk type. The actual chunk type may be represented by an index entry. The Flags may include information used to distinguish different chunks of the same type. The Offset value may be defined as an offset from a particular LIST in the file (or an absolute file offset). The ChunkSize may be used to hold an actual size of the chunk which is being represented.

An optical disc may be generally referred to as a flat, circular disc made of polycarbonate material for storing data. Bits of data may be laid down following a single contiguous spiral track. One category of such a media is a read only disc. The data on a read only disc may be accessed when a special reflective material on the disc (e.g., often aluminum) is illuminated with a laser diode. On write-once recordable discs (or write once media), the reflectivity of an organic dye may be permanently changed (e.g., the organic dye is heated with a laser). In rewritable discs, the recording layer may be made of a metal alloy. The form of the metal allow may be switched from crystalline to amorphous by being heated at different temperatures. Different temperatures may be achieved by varying the power of the laser and allowing data to be erased and written again.

The write-once recordable media may be written to only once. Data may be appended to partially written discs, but not erased or overwritten. Rewritable discs may be written, erased or overwritten many times but a distinction has to be made. Some types of discs may be erasable. Such discs may be (i) written as write-once discs and (ii) erased or blanked to start the writing process again as if the disc had never been used. In contrast, fully rewritable discs may be overwritten a number of times and in different segments. A number of predefined disc standards define how data is written to a disc. If data is not written according to one of such standards, such data may not be able to be subsequently read.

The most common families of optical discs are CDs and DVDs. CDs represent the first generation of optical discs. CDs may be used to store various data, such as audio files. Personal Computer (PC) software, etc. DVDs represent a second generation of optical discs. DVDs may (i) offer a higher capacity and (ii) store digital video, PC software and data. CDs and DVDs may be present as read only (CD-ROM, DVD-ROM), recordable (CD-R, DVD-R, DVD+R) and rewritable (CD-RW, DVD-RW, DVD+RW, DVD-RAM) types. In general, CD-RW and DVD-RW may not be fully rewritable. CD-RW and DVD-RW may be fully erasable. CD-RW and DVD-RW may be fully rewritable if physically formatted to be used in a fully rewritable manner.

While data may be stored on media using error correction codes and control patterns, an Optical Recording Unit (e.g., a physical device used in reading and writing to the optical media) may present the actual content of the disc as a contiguous space organized in sessions, tracks and sectors (or Logical Blocks). The smallest addressable amount of data may be a 2048 byte sector. The address may be referred to as Logical Block Address (LBA). Sectors (or LBAs) are numbered starting from 0 and upward. Even though the LBA space may be contiguous from the beginning to the end of the disc, because of the original audio CD-ROM structure, the LBA space may be organized in tracks. The tracks may be grouped into sessions.

Write-once media may have to be written to sequentially to comply with known predefined standards. In general, each written extent (a contiguous segment of the file) may be arranged on the disc as a track. Tracks may be written to sequentially one by the other. A track may be reserved to alter the order in which consecutive extents are written to the disc, with the following restrictions:

(i) the track length may need to be compatible with the error correction scheme used on the disc;

(ii) a gap may need to be left between tracks, the contents of which may be decided by the Optical Recording Unit; and (iii) the maximum number of reserved tracks may be limited to 2.

Read only discs may be made of one session. Writable and rewritable discs may be recorded in several iterations. Each time tracks are added to the disc, the tracks may need to be enclosed in a session in order to be recognized by read only Optical Recording Units. Usually fully rewritable discs may be organized in a single session with a single track. Since there may be no need to add a track in order to add more data to the disc, old data may be overwritten and new data may be appended so long as the end of the track and the end of the session are moved appropriately.

With mass storage devices (except for audio CDs), data on optical discs may be organized in a logical file format (or file system). The two most popular file systems for optical media are ISO9660 (introduced for data CD-ROMs) and universal disk format (UDF) (the standard for DVDs). The disc content may be divided into several files. The files may be presented to the user in the form of folders and sub-folders. The folders and sub-folders may be managed through additional data structures available on the disc.

Figure 3:
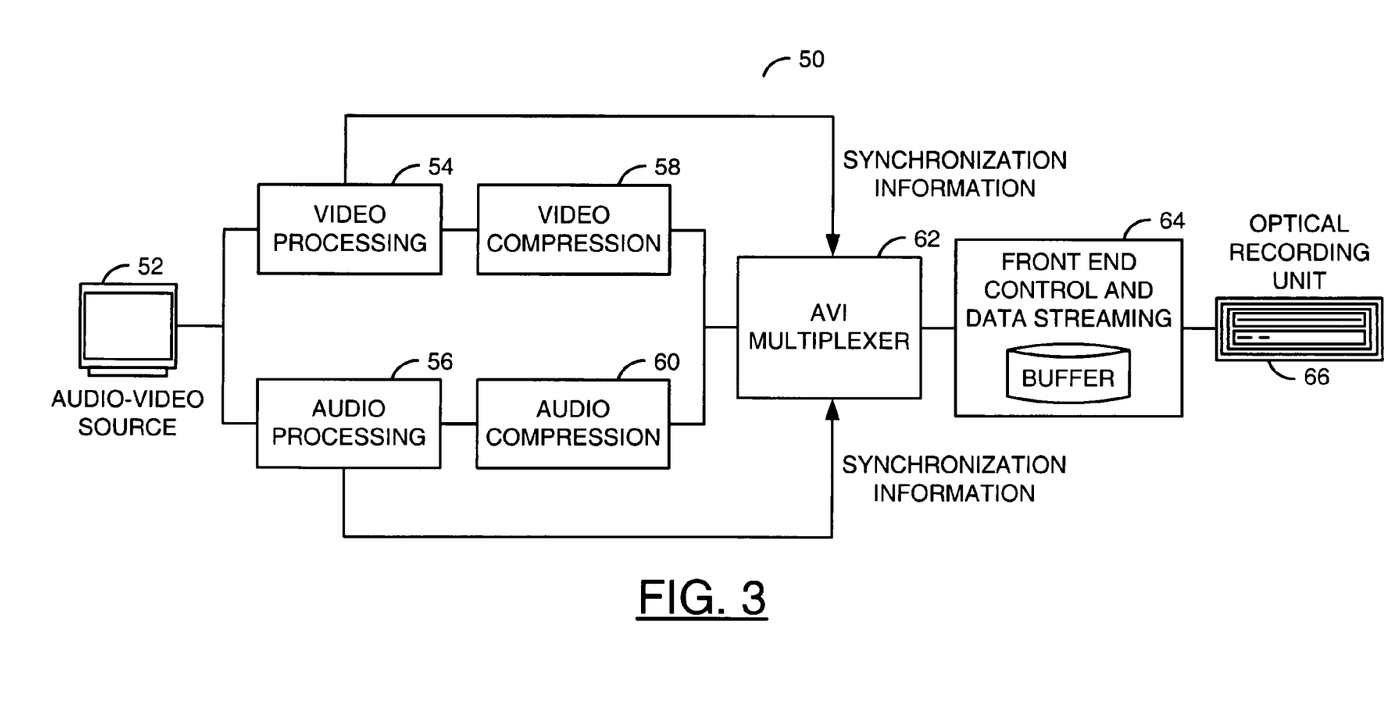
FIG. 3 is a diagram illustrating a real-time encoding system.

Referring to FIG. 3, a diagram illustrating a real-time encoding system 50 is shown. The system 50 may be adapted to apply to any system which performs real-time recording of the AVI file format. The system 50 generally comprises an audio-video source 52, a video processing block 54, an audio processing block 56, an AVI multiplexer 62, a front end control block 64, and an optical recording unit 66.

The audio-video source 52 may be derived from an analog source (e.g., an analog over-the-air or analog cable television signal) or a digital source (e.g., a digital satellite broadcast system). In the case of an analog source, the information may be pre-processed and digitized. The video processing block 54 may compress video data to generate video compression data 58. The video compression data 58 may be a video elementary stream. The audio processing block 56 may compress audio data to generate audio compression data 60. The audio compression data 60 may be an audio elementary stream. The AVI multiplexer 62 may multiplex and synchronize the video elementary stream and the audio elementary stream together to form an AVI file. The front end control block 64 may perform error correction on the multiplexed audio and video stream. The optical recording unit 66 may record the multiplexed video-audio stream on an optical disc. When the audio-video source 52 is a digital source, the data may go through some form of a transcoding process. In the transcoding process, the digital data may be decoded into an uncompressed representation and then re-compressed into a different format. AVI files may be capable of storing both compressed and uncompressed audio and video information.

The term 'real-time' refers to a system where the speed of audio-video capture, processing, encoding, and recording onto the final storage media occurs with an overall memory constraint. The overall media constraint may be equivalent or smaller than then total storage space needed for recording the entire session onto the final storage media. Some blocks in the system may operate faster than others. However, a restricted amount of intermediate storage space may demand that the overall system functionality occur faster than the rate of audio, video, and other data capture.

The overall nature of AVI files may need some global knowledge about the overall construction of the file. Such a characteristic of the AVI format becomes important when performing real-time recording of multimedia information onto write-once media and/or on re-writable media which may allow recording in the logical format of a write-once media. The method described in connection with FIGS. 4 and 9 may be applicable for preparing and recording an AVI file onto re-writable media, or any other media persistent data storage device (e.g., a hard-disc or flash memory).

More specifically, the formats targeted by the present invention may include, but are not limited to, optical CD-R media, optical DVD-R and DVD+R media, optical CD-RW and DVD-RW re-writable media that are recorded in a specific format known as the incremental mode. Other formats may include fully re-writable CD-RW, DVD-RW, DVD+RW. The present invention may be equally applicable to any other advanced optical media such as write-once media, re-writable BluDisc and HD-DVD.

The specific processes of recording to write-once media (WOM) generally includes a set of restrictions which apply to various classes of optical media. Such restrictions may include:

(i) after recording data onto the WOM, such data may not be altered or re-recorded;

(ii) a track may only be written sequentially, starting from the first Logical Block Address (LBA) to the LBA of that track;

(iii) while altering the write-order, generally an entire track may be reserved. A reserved track may be composed of a pre-determined length of data. The predetermined length of data may be recorded to only after the last track of the disc has been completely recorded. Such an operation may be compared to (a) reserving a portion of the disc, (b) writing to a different portion, and (c) coming back to fill out the reserved portion; and (iv) the optical recording device may need to leave unrecorded space between two tracks when the tracks have been reserved and recorded out of order. Such a gap in data may be readable by other optical devices. A typical gap on (a) DVD media may be 16 sectors, and (b) CD media may be around 150 sectors.

Figure 4:
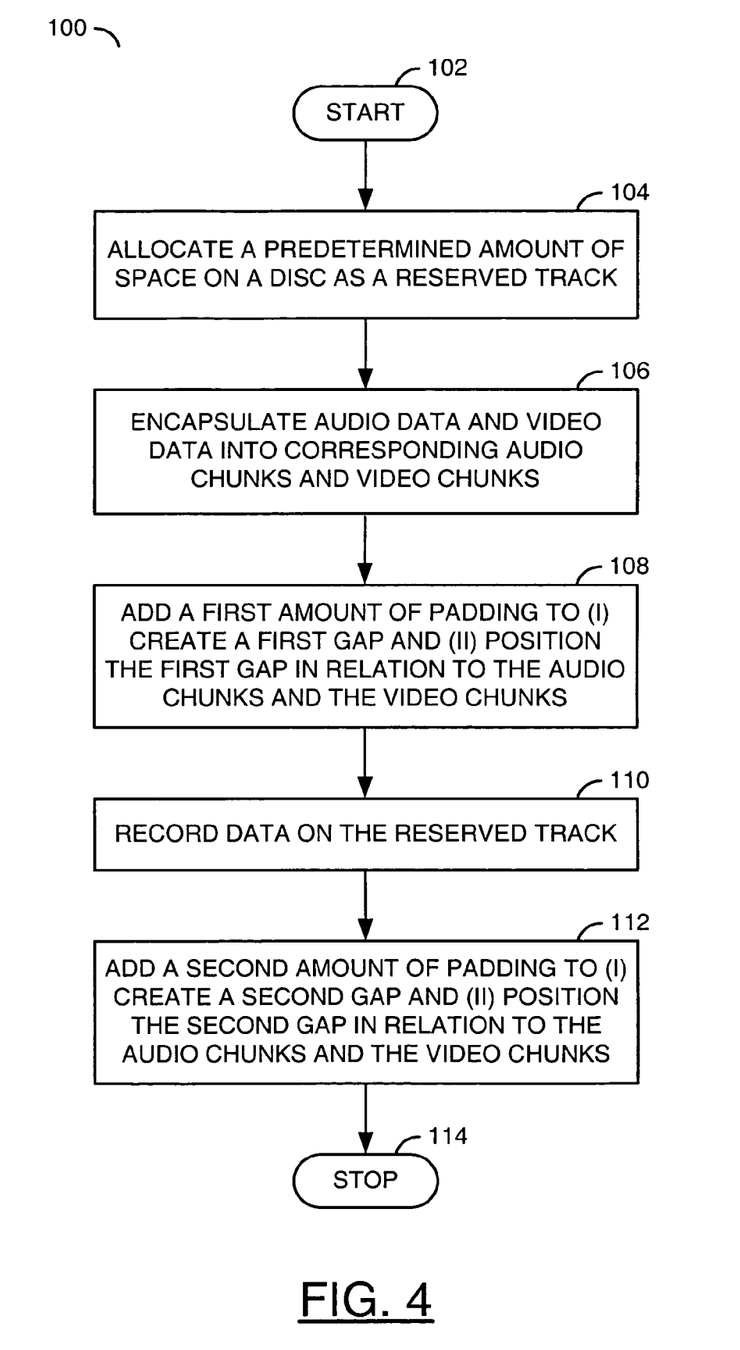
FIG. 4 is a method illustrating the present invention.

Referring to FIG. 4, a method 100 illustrating the present invention is shown. The method 100 may (i) satisfy all restrictions which apply to a number of classes of storage media and (ii) provide a common process of recording AVI files to any storage media type. The method 100 generally comprises a state (or step) 102, a state (or step) 104, a state (or step) 106, a state (or step) 108, a state (or step) 110, a state (or step) 112 and a state (or step) 114. The state 102 generally comprises a start state. The state 104 may allocate a predetermined amount of space on a disc as a reserved track. The reserved track may include all pertinent AVI header information.

The state 106 may encapsulate audio data and video data into corresponding audio chunks and video chucks. As the actual real-time capture, encoding, and multiplexing process begins, the audio and video data may be encapsulated into corresponding audio and video chunks. The audio and video chunks may be buffered and transferred to the optical drive for actual recording on the WOM (or any other writable format). The buffering of the audio and video chunks may range from a single byte, to storing a complete set of video and audio chunks for that particular recording session.

The state 108 may add a first amount of padding to (i) create a first gap (e.g., data gap on the disc) and (ii) position the first gap in relation to the audio chunks and the video chunks. In one example, the first amount of padding may be added at the end of the list movi chunk for the purpose of achieving alignment (or for other application-related reasons). The first amount of padding may be inserted as a 'reserved' chunk (or JUNK chunk), or as a hypothetical audio, video, or data stream in the movi list chunk. In one example, the first amount of padding may be inserted as a sub-chunk within the movi list chunk, or as an independent chunk following the movi list chunk. It may be possible to bypass the state 108 all together such that the list movi chunk is immediately followed by the index chunk.

The state 110 may record data on the reserved track. After recording all audio, video, and other pertinent data, the size of the movi list chunk may be determined by adding the size of all audio chunks, video chunks, data chunks, and padding chunks (e.g., first amount of padding) with the following equation:

$$movi\_list\_size = \sum_{n=1}^{ta} audiochunksize_n + \sum_{n=1}^{tv} videochunksize_n + \sum_{n=1}^{tp} otherchunksize_n$$

where ta may be the total audio chunks, tv may be the total video chunks, and to may be the number of any other chunk type in the movi list. The reserved track may be recorded with the (i) the RIFF header, (ii) AVI Header, (iii) movi list chunk and corresponding size of the movi list chunk, and (iv) padding (e.g., the first amount of padding) used to generate data gaps. The RIFF header includes the overall file size, which may be composed of all headers, underlying chunks, and extra padding information.

The state 112 may add a second amount of padding to (i) create a second gap and (ii) position the second gap in relation to the audio and video chunks. In one example, the second amount of padding may be positioned before the audio and video chunks, and immediately at the start of the list movi chunk. The second amount of padding may be inserted as a 'reserved' chunk (or JUNK chunk), or as a hypothetical audio, video, or data stream in the movi list chunk. The index chunk may provide an index of each recorded audio and video chunk. The index chunk may be recorded on the disc and on the area after (i) the movi list chunk, (ii) the first amount of padding (or padding chunks) in the movi list chunk and (iii) after the audio and video chunks. In one example, the padding chunks added to the movi list chunk may include corresponding FOURCC codes. The corresponding FOURCC codes may be added to the index chunk. Different FOURCC codes may be added to represent the first amount of padding in the index chunk. In one example, the method 100 may perform the step 112 before performing steps 108 and 110. In general, the method 100 may provide a gap between two tracks in order to allow for the real time recording of AVI files on any writable media. The method 100 may allow for the recording of AVI files on a WOM which is fully compliant with WOM standards, restrictions and specifications.

Figure 5:
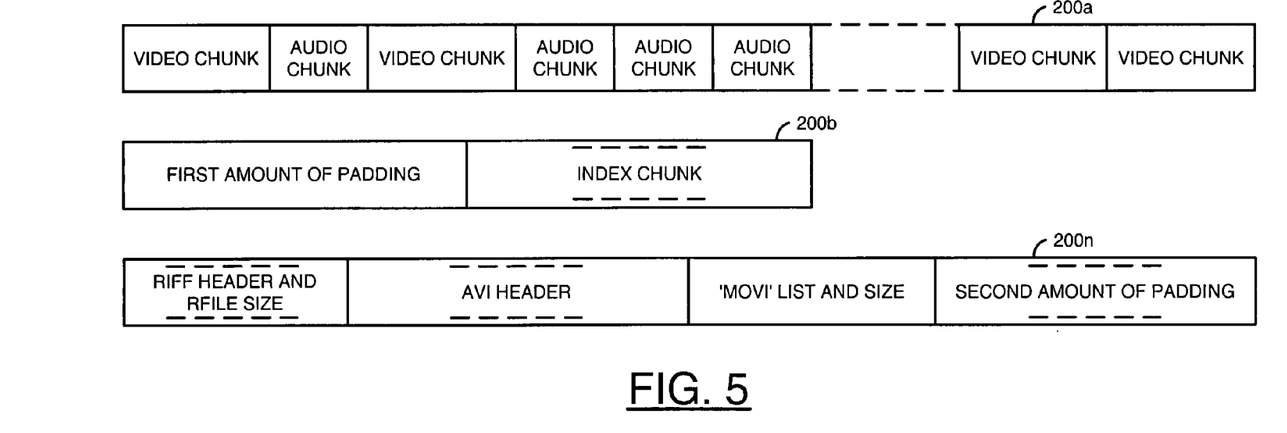
FIG. 5 is a diagram illustrating AVI file recording segments.

Referring to FIG. 5, a diagram illustrating data recording segments 200a-200n is shown. While the data recording segments 200a-200n illustrates 3 recording segments, the actual recording process may be divided into more or fewer segments to meet the design criteria of a particular implementation. The recording segment 200a may represent the video and audio chunks which are recorded created and multiplexed by the real-time encoder system 50. The recording segment 200b may represent data which may be recorded at the end of the AVI file. The recording segment 200b includes the first amount of padding (or padding chunk) along with the index-chunk. The recording segment 200n may present the header data as recorded on the reserved track. The header data may include (i) the RIFF header and size, (ii) the AVI header, and (iii) the movi list and size. The padding chunk may be applied inside the movi list chunk.

Figure 6:
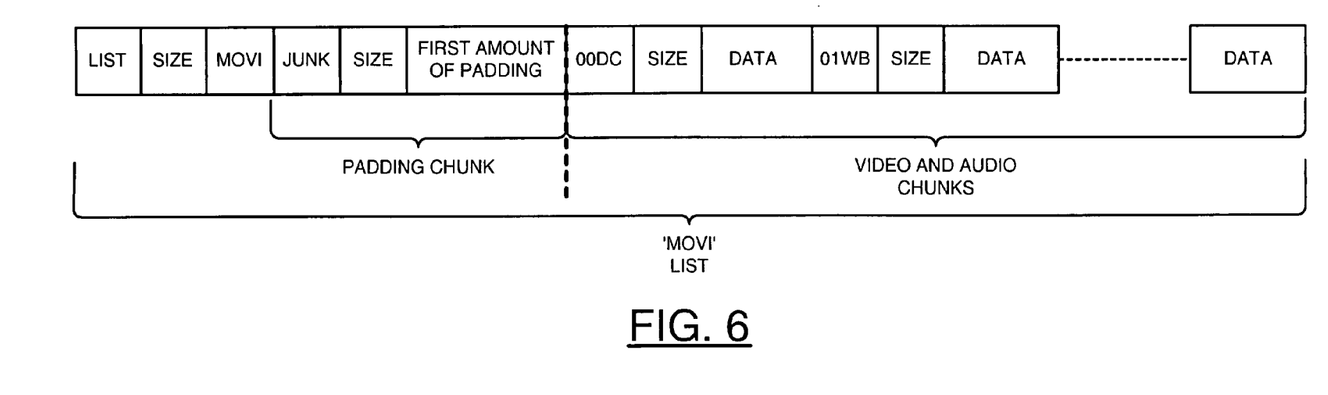
FIG. 6 is a diagram illustrating a detailed composition of the movi list.

Referring to FIG. 6, a more detailed composition of the movi list chunk is shown. The padding chunk may be composed of the hypothetical 'JUNK' FOURCC code. In one example, the padding chunk may also be represented by any other valid FOURCC code defined to exist inside or outside of the movi LIST chunk. The particular representation of the padding chunk via a valid FOURCC code may be varied to meet the design criteria of a particular implementation. The audio and video chunks may be represented by the '00dc' and the '01wb' FOURCC codes. The positioning of the padding chunks in the (i) movi list chunk and (ii) index chunk (e.g., after the movi list chunk) provides a compatible format for recording AVI file on WOM.

Figure 7:
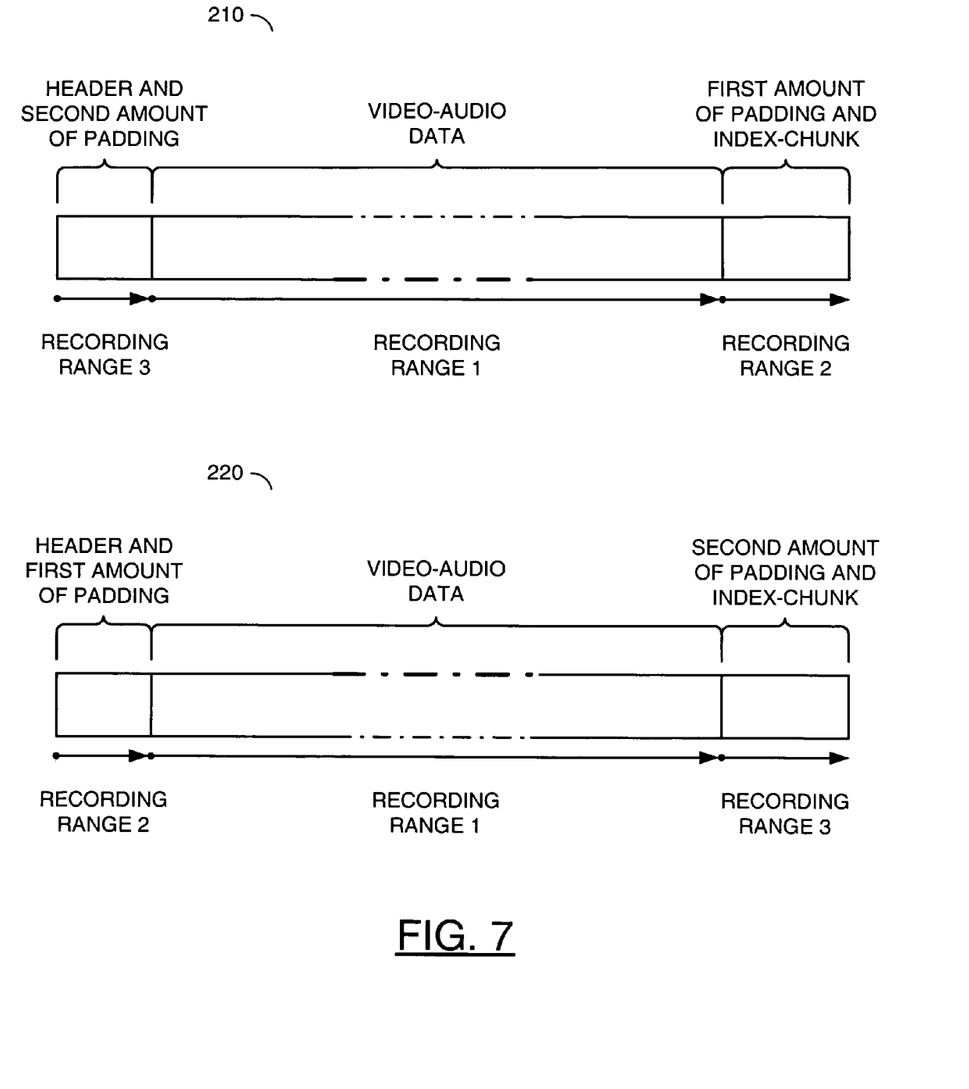
FIG. 7 is a diagram illustrating different writing sequences on a writable disc.

Referring to FIG. 7, a diagram illustrating writing sequences on a writable disc. In a write sequence 210, the audio-video data may be written as audio and video chunks first. The first amount of padding and the index chunk may be recorded second. The header data and second amount of padding may be recorded third.

In a write sequence 220, the audio-video data may be recorded as audio and video chunks first. The header data and the first amount of padding may be recorded second. The second amount of padding and the index chunk may be recorded third. The write sequence 220 and the write sequence 220 illustrate that the recording of data on the disc may occur in different steps. In the write sequence 210, recording of the first amount of padding may be omitted. In the write sequence 220, recording of the second amount of padding may be omitted.

Figure 8:
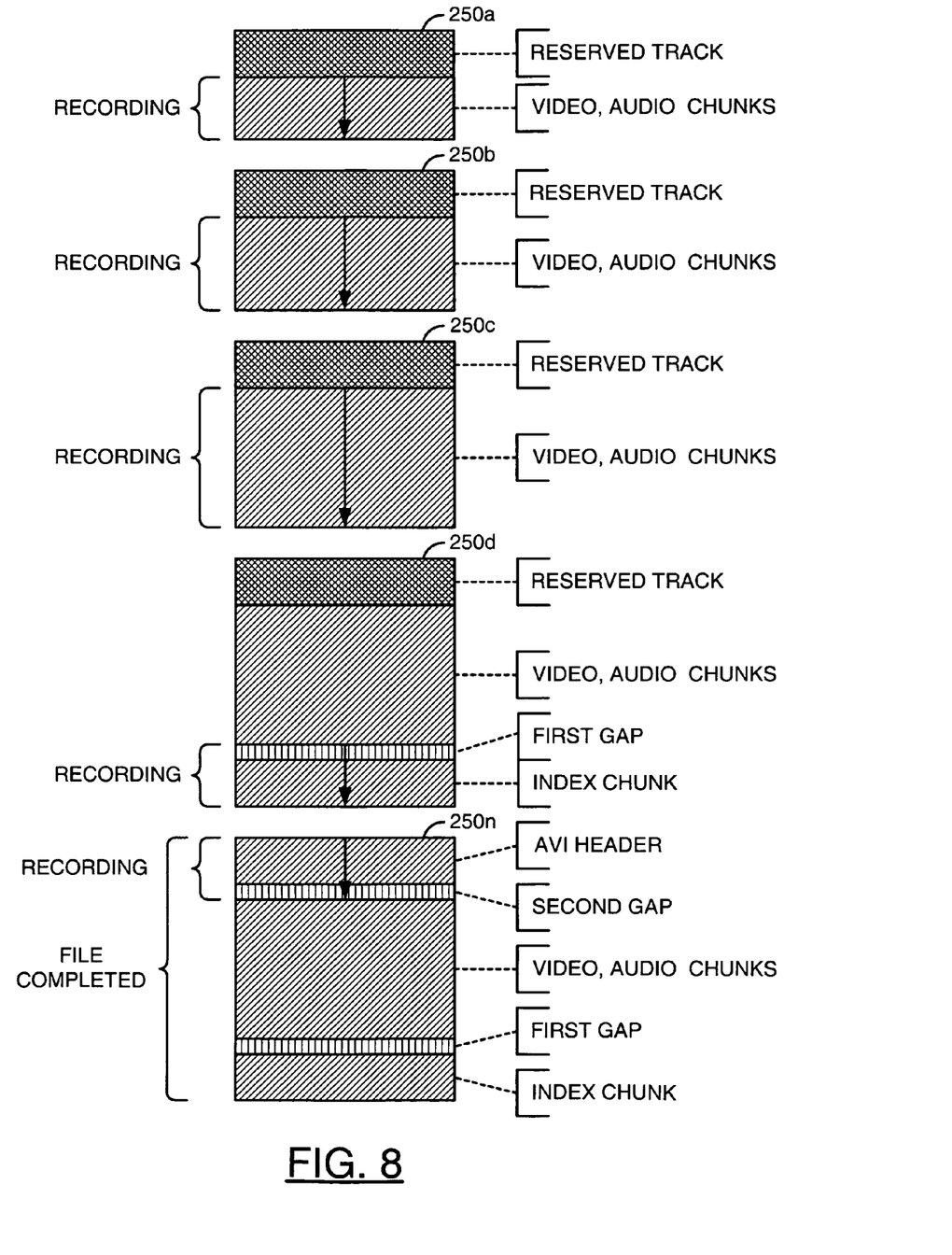
FIG. 8 is a diagram illustrating recording phases for compatibility with a writable disc.

Referring to FIG. 8, a diagram illustrating the recording phases of write sequences 250a-250n are shown. In a recording phase 250a, a predetermined amount of space may be reserved to create the reserved track. Audio and video chunks may begin to be recorded on the disc. In recording phases 250b-250c, audio and video data chunks may continue to be recorded on the disc. In recording phase 250d, at the completion of recording audio and video data, the first amount of padding may be added after the recorded audio and video chunks to create the first gap. The index chunk may be recorded. In recording phase 250n, (i) the reserved track may be recorded as the header data (or AVI header) and (ii) the first amount of padding may be added before the recorded audio and video chunks to create the second gap. The particular order of the recording phases 250a-250n may be varied to meet the design criteria of a particular implementation. The write sequence 250a-250n may represent the recording sequence 210 as shown in connection with FIG. 7. The present invention may provide a gap between two tracks of a disc for an AVI file and in the AVI file header. By providing a gap between two tracks, the AVI file may be recorded on a WOM.

Figure 9:
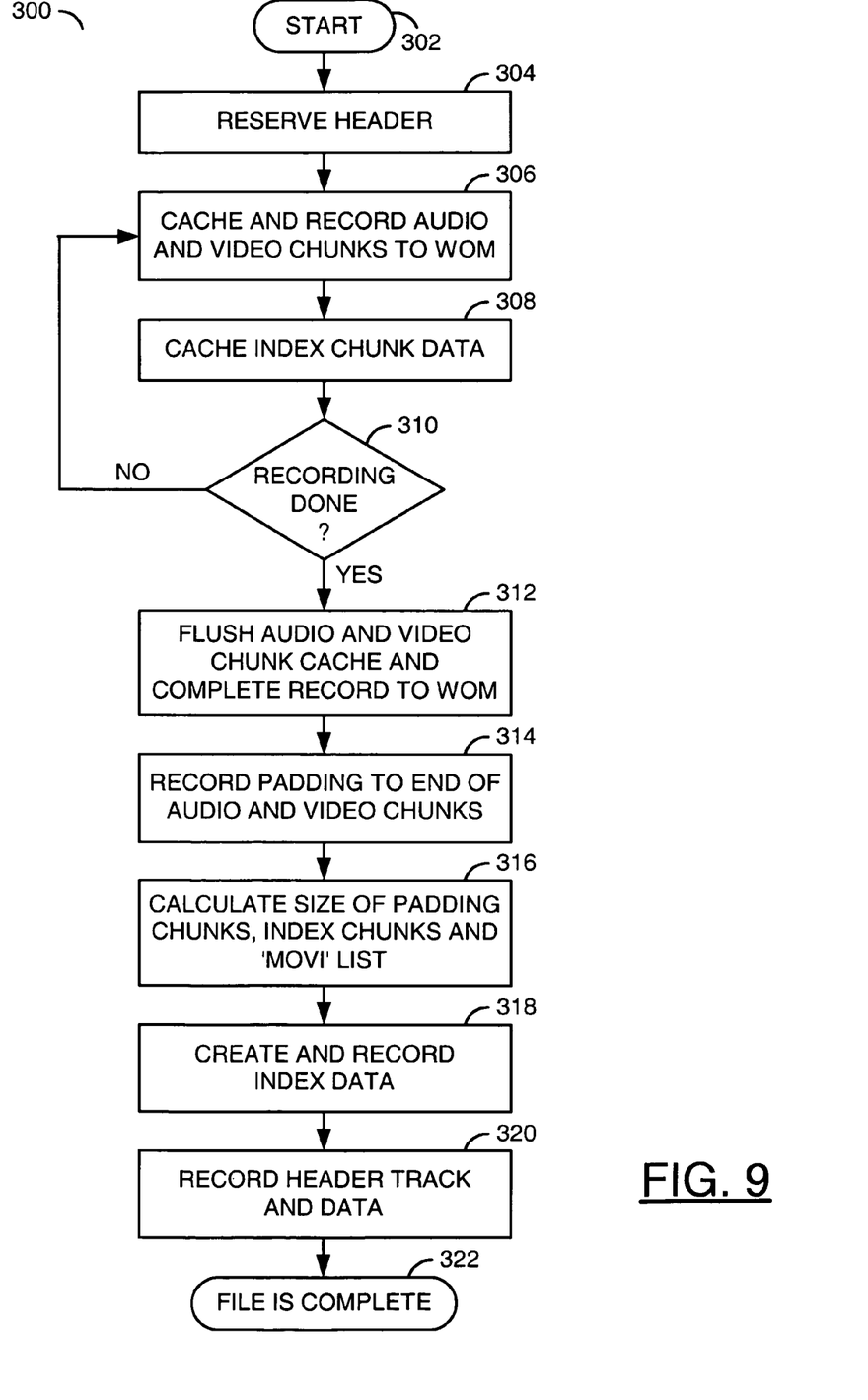
FIG. 9 is a diagram of a method illustrating steps in creating an AVI file on a writable disc.

Referring to FIG. 9, a method 300 of creating and recording an AVI file on a writable disc is shown. The method 300 generally comprises a state (or step) 302, a state (or step) 304, a state (or step) 306, a state (or step) 308, a decision state (or step) 310, a state (or step) 312, a state (or step) 314, a state (or step) 316, a state (or step) 318, a state (or step) 320 and a state (or step) 322. The state 302 may be a start state. The state 304 may reserve a header on the disc. The state 306 may cache and record audio and video chunks to the disc. In one example, the state 306 may cache and record audio and video chunks to the WOM. The state 308 may cache index chunk data. The decision state 310 may determine if the recording of audio and video chunks to the disc has been completed. If the recording of audio and video chunks have not been completed, the method 300 moves to the state 306. If the recording of audio and video chunks have been completed, the method 300 moves to the state 312. The state 312 may flush the audio and video chunks cache and complete the recording to the disc.

The state 314 may record and add the first amount of padding to the end of the audio and video chunks. The state 316 may calculate the size of the padding chunks (or the first amount of padding), the index chunk and the movi list. The state 318 may create and record index data. The state 318 may be illustrated by the recording segment 200b as shown in connection with FIG. 5. The state 320 may record the header track and data. The state 320 may be illustrated by the recording segment 200n as shown in connection with FIG. 5. The state 322 may complete the recording of the file.

Different classes of WOM may exhibit other restrictions during the real-time recording process. The present invention may provide for a generic procedure for augmenting the contents of an AVI file to successfully record onto any particular class of write-once media, erasable, or fully re-writable media. The present invention provides a common method for recording to a number of writable media while remaining fully compliant with restrictions set for any number of media.

The function performed by the flow diagram of FIGS. 4 and 9 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method of recording Audio-Video Interleaved (AVI) files on a disc, comprising the steps of:
   (a) allocating a predetermined amount of space on said disc as a reserved track;
   (b) encapsulating audio data and video data into corresponding audio chunks and video chunks to be recorded on said disc;
   (c) adding a first amount of padding to (i) create a first gap and (ii) position said first gap in relation to said audio chunks and said video chunks in response to completely recording all of said audio chunks and said video chunks;
   (d) recording data on said reserved track; and
   (e) adding a second amount of padding to (i) create a second gap and (ii) position said second gap in relation to said audio chunks and said video chunks and (iii) allow the recording of said Audio-Video Interleaved file to be compliant with a predefined disc standard.

2. The method according to claim 1, further comprising the steps of:
   positioning said first gap before said audio chunks and said video chunks; and
   positioning said second gap after said audio chunks and said video chunks, wherein said first gap and said second gap are different.

3. The method according to claim 1, further comprising the steps of:
   positioning said first gap after said audio chunks and said video chunks; and
   positioning said second gap before said audio chunks and said video chunks.

4. The method according to claim 1, wherein step (c) further comprises the step of:
   adding said first amount of padding in proximity to a movi list chunk.

5. The method according to claim 4, further comprising the step of:
   adding said first amount of padding as a reserve chunk relative to said movi list chunk.

6. The method according to claim 5, further comprising the step of:
   adding said first amount of padding as a reserve chunk positioned within said movi list chunk.

7. The method according to claim 5, further comprising the step of:
   adding said first amount of padding as an independent chunk positioned after said movi list chunk.

8. The method according to claim 4, further comprising the step of:
   calculating a list size of said movi list chunk in response to completely recording all of said audio chunks and said video chunks.

9. The method according to claim 1, wherein step (e) further comprises the step of:
   adding said first amount of padding to (i) create said second gap and (ii) position said first amount of padding after said audio chunks and said video chunks and within an index chunk.

10. The method according to claim 1, wherein said data comprises a Resource Interchange File Format (RIFF) header, an Audio-Video Interleaved header a movi list size and said first amount of padding.

11. The method according to claim 1, wherein said predefined disc standard is a predefined optical disc standard.

12. The method according to claim 1, wherein said disc is selected from a group consisting of a write-once, erasable, and fully re-writable media.

13. A non-transitory computer readable medium containing processor executable instructions configured to perform the steps of:
   (a) allocating a predetermined amount of space on a disc as a reserved track;
   (b) encapsulating audio data and video data into corresponding audio chunks and video chunks to be recorded on said disc;
   (c) adding a first amount of padding to (i) create a first gap and (ii) position said first gap in relation to said audio chunks and said video chunks in response to completely recording all of said audio chunks and said video chunks;
   (d) recording data on said reserved track; and
   (e) adding a second amount of padding to (i) create a second gap and (ii) position said second gap in relation to said audio chunks and said video chunks and (iii) allow the recording of an Audio-Video Interleaved file to be compliant with a predefined disc standard.

14. The method according to claim 1, wherein the AVI file is recorded in realtime on a (i) write once and rewritable Blu Disc and (ii) a write once and rewritable HD-DVD.

15. The method according to claim 1, wherein the AVI file is recorded and formatted on said disc as a contiguous file on any form of data-persistent media.

16. The method according to claim 5, wherein said reserved chunk is defined as being selected from the group consisting of a junk chunk, a hypothetical audio chunk, a hypothetical video chunk, and a data chunk.

17. The method according to claim 1, wherein said first gap and said second gap are defined as an unrecorded space between two tracks of said disc.

18. The method according to claim 1, wherein said predefined disc standard is a write once media disc standard.

19. An apparatus comprising:
   means for allocating a predetermined amount of space on a disc as a reserved track;
   means for encapsulating audio data and video data into corresponding audio chunks and video chunks to be recorded on said disc;
   means for adding a first amount of padding to (i) create a first gap and (ii) position said first gap in relation to said audio chunks and said video chunks in response to completely recording all of said audio chunks and said video chunks;

means for recording data on said reserved track; and means for adding a second amount of padding to (i) create a second gap and (ii) position said second gap in relation to said audio chunks and said video chunks to allow the recording of an Audio-Video Interleaved file to be compliant with a predefined disc standard.

* * * * *